United States Patent [19]

Hall

[11] Patent Number: 5,126,728
[45] Date of Patent: Jun. 30, 1992

[54] ADP SECURITY DEVICE FOR LABELED DATA

[76] Inventor: Donald R. Hall, 309 N. Fillmore St., Arlington, Va. 22201

[21] Appl. No.: 362,521

[22] Filed: Jun. 7, 1989

[51] Int. Cl.[5] .............. H04K 9/00; G06F 12/14; G06F 7/02
[52] U.S. Cl. .................. 340/825.3; 380/4; 364/DIG. 2; 364/943.1; 364/918.7
[58] Field of Search .................. 364/200, 900; 380/4, 380/25; 340/825.3, 825.31, 825.34

[56] References Cited

U.S. PATENT DOCUMENTS

| | | | |
|---|---|---|---|
| 3,508,205 | 4/1970 | Kubie | 364/200 |
| 3,800,288 | 3/1974 | Russell et al. | 364/200 |
| 3,806,882 | 4/1974 | Clarke | 364/200 |
| 3,872,444 | 3/1975 | Cleveland et al. | 364/200 |
| 3,911,404 | 10/1975 | O'Neill, Jr. | 364/900 |
| 3,921,148 | 11/1975 | Ophir et al. | 364/900 |
| 3,956,739 | 5/1976 | Ophir et al. | 364/900 |
| 3,971,000 | 7/1976 | Cromwell | 364/200 |
| 4,047,248 | 9/1977 | Lyman et al. | 364/900 |
| 4,057,849 | 11/1977 | Ying et al. | 364/900 |
| 4,128,874 | 12/1978 | Pertl et al. | 364/200 |
| 4,241,415 | 12/1980 | Masaki et al. | 364/900 |
| 4,244,049 | 1/1981 | York et al. | 364/900 |
| 4,319,336 | 3/1982 | Anderson et al. | 364/900 |
| 4,354,252 | 10/1982 | Lamb et al. | 364/900 |
| 4,434,471 | 2/1984 | Hildinger | 364/900 |
| 4,456,969 | 6/1984 | Herzik et al. | 364/900 |
| 4,459,049 | 7/1984 | Howell et al. | 364/900 |
| 4,462,701 | 7/1984 | Czyszczewski et al. | 364/900 |
| 4,463,444 | 7/1984 | Daniels et al. | 364/900 |
| 4,464,730 | 8/1984 | Lawrence et al. | 364/900 |
| 4,484,306 | 11/1984 | Kulczyckyj et al. | 364/900 |
| 4,574,363 | 3/1986 | Carlgren et al. | 364/900 |
| 4,628,479 | 12/1986 | Borg et al. | 364/900 |
| 4,707,801 | 11/1987 | Barnes et al. | 364/900 |
| 4,864,494 | 9/1989 | Kobus, Jr. | 364/200 |

*Primary Examiner*—Gareth D. Shaw
*Assistant Examiner*—Matthew C. Fagan
*Attorney, Agent, or Firm*—Fisher, Christen & Sabol

[57] ABSTRACT

A data processing security device, attached to computing equipment, inserts labels into a data stream that indicate security controls for the data. The security device may also be configured to detect security labels within a data stream and inhibit the flow of data. It also may replace data within a data stream if it detects labeled fields which indicate that privacy should be imposed.

24 Claims, 4 Drawing Sheets

ADP SECURITY DEVICE FOR LABELED DATA

BACKGROUND

1. Field of the Invention

This invention relates to automated data processing information security, especially in preventing the exposure of restricted data to individuals not authorized to view it, and controlling the flow of labeled data.

2. Description of Prior Art

The field of Automated Data Processing Security is growing rapidly in response to the vast use of ADP equipment within government and industry. Some government systems handle data that bears various levels of classification and handling restrictions. Many private data base systems contain information that relates to individuals to which general access should be restricted. New security tools and practices that provide multiple levels of access privileges to special categories of data are of growing interest in ADP activities.

Often information about employees or individuals is stored on the same automated data processing equipment that is used to store corporate business data. General users of the information processing equipment should not have access to personnel data which has come to be known as privacy data. Other kinds of data also exist on government and private computers that should have access limiting controls on it.

Vendors of data base management software sometimes offer protection for data by requiring users attempting to access it to provide additional passwords. But there is evidence that password protection does not protect data if a skilled technician accesses the files through other software or by direct access to the files using utility software. Software vendors that sell operating systems are now attempting to develop software that can be submitted to the Department of Defense Computer Security Division for testing and certification of its secure features. But even certified operating systems fail to provide protection if the computer hardware should malfunction and inadvertently read an area of data storage, that was not intended to be addressed, and consequently deliver unexpected data to the user.

Some methods of protection are in use that encrypt or scramble the protected data, and 'keys' are required to decrypt or unscramble the data when it is accessed. The additional computer activity to accomplish this results in a very high burden for the computer and slows responses to user requests considerably, which makes this technique very expensive in terms of computer resources.

A large unit of data may be referred to as a record. Many computer protection schemes attempt to protect data at the record level. Record level protection usually means that before an entire record or large body of data is released for access, a security label for the document or record is tested. This label is tested against the known users access rights. But often there is data within records that should be given different levels of protection. When provided, this is called field level protection and is provided in some data bases, but is only effective when the data base management system is being used to access the data. A skilled computer user may access it directly.

For documents in text data bases only the document is labeled with no field protection available. This is also true for electronic mail. The invention described herein will provide protection for record level and field level data even if other security measures have failed, and even if the computer should malfunction and attempt to send data to an output device to which it should not be delivered.

Within the field of ADP security the language refers to protected objects and authorized processes. A computer program is regarded as a process and all processes must have the correct permissions to access any of the objects within the ADP environment. Records, files, peripherals and even other programs can be labeled objects.

The labeling method herein described can also be an effective security tool for software developers working within a computing environment where several levels of labeled data are handled. Engineers developing software for these multi-level systems are required to design tests within their software that will adequately test the data as it is processed, and verify that the data matches all access rights in effect at that point in time. This can be a difficult problem for a programmer, since the data can not usually be analyzed by its content to resolve how it should be protected. The program data, when retrieved, are provided with a label for the entire contents of the package that the program must accept as accurate. It is during the attempt to retrieve data that most access restriction schemes are applied. After the delivery process starts, there is no way for a process to verify that the following blocks of data being delivered are in fact in agreement with the original label. If some retrieval failure occurs the program can not evaluate the data to determine if the label/object integrity is still intact. With no way of determining the security level of the data itself, a non-valid label can cause security failures within a trusted process. If the given label for an object is stored in a file header, or some other location outside the real data, the options available to a programmer to verify that the label is correct for a given object are limited. The ratio of the amount of data protected per label is indicative of the level of risk of a label compare failure. Vastly increasing the labeling within a system would multiply the opportunity to apply security procedures and reduce the level of loss for a single label/object compare failure. The invention described herein vastly increases the labeling within a system and provides a means of limiting losses due to a label/object failure to 79 characters or less. The system described herein may be an adjunct to exiting security methods with little or no re-engineering of the system.

In the prior art most of the security concerns are related to controlling access to a computer and authenticating users. But one idea that is in the prior art, (U.S. Pat. No. 4,128,874 Pertl et al Dec. 5, 1978) was related to addressing some of the problems of data being inadvertently directed out of the computer. The idea was to assign a key field within each word in the computer, when stored in memory. After data was retrieved to be output from the computer the key field which traveled with the data was checked against a lock known to be valid for the output session. If an equipment failure occurred, the output data bearing an inappropriate key field would be tested and detected at the lock and the data would be stopped. To implement this idea the mainframe computer architecture was re-designed to provide the key field testing in the i/o subassemblies and system software modification would be required to implement the design. The major architecture changes in the mainframe computer could not be applied retroactively to machines deployed and in service. A very high overhead would be incurred providing space for key fields within every data word. The definition of the data word is interpreted to mean the computer word that the computer used for its bus operations. This key/-labeling of every word would mean at least every bus operation handling the data would be capable of handling at least one less character per transfer. On a 16 bit processor using 8 bit characters, the key field would occupy some portion of one of the fields of 8 bits within the 16 bit word and would preclude the use of the key field for transfer of a character. The eight bits so occupied would create a 50% overhead for character data operations on a 16 bit machine which would seriously degrade throughput. Even a 25% overhead on a 32 bit machine, which is the primary word size in use today, would be a high price in computer resources. The overhead may be acceptable for some very heavy security facilities, but not likely to be acceptable for a private enterprise that may wish to provide some protection for privacy data.

It is generally accepted that additional controls are needed to secure data on most machines. If a user should circumvent a data protection scheme all the data thus protected becomes available to him. A method of limiting losses from a given security failure will enhance a system's general security by increasing the amount of time an intruder would spend attempting to steal a given quantity of information. This increase in effort limits the total quantity of data that can be stolen over a given amount of time, 'bandwidth of a covert channel', as they are called, and exposes the channel to audit trails and other forms of detection if the intruder persists in his attempts for extended periods.

OBJECTS AND ADVANTAGES

Accordingly, I claim the following as the objects and advantages of the invention:
 (a) to provide a process that can easily, reliably and neatly control the flow of protected data through the computing environment and vastly increase the number of labels for protected objects
 (b) to provide a tool which will allow labeled data to pass, be stopped, or be replaced with fill characters so as to eliminate the sensitive information from being passed on
 (c) to provide a general form of labeling that can be applied to control data storage, data flow and data handling with negligible cost in throughput
 (d) to provide for the protection of data that may be inadvertently addressed by the computer and would otherwise be spilled to an unintended user
 (e) to provide protection for data that is within a document that needs to be protected at a higher level than the document itself
 (f) to provide a method for alerting the computer operation indicating protected data has been detected and halted at an output port of a general purpose computer
 (g) to provide a simple method for enhancing the security of data stored on a general purpose computer that can easily be put into place without modifying the internal system software or hardware.

DRAWINGS AND FIGURES

DESCRIPTION

Figure 1:
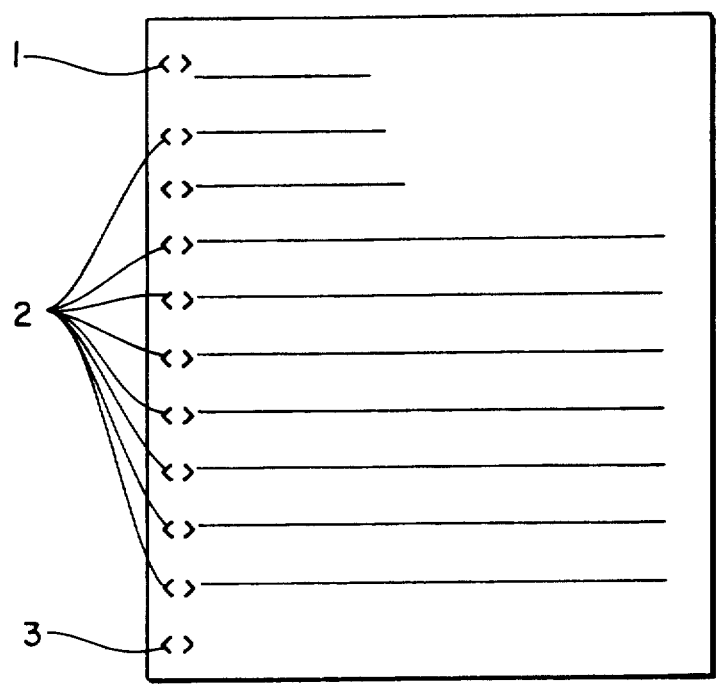
FIG. 1 shows a conceptual page from a document that has had security labels affixed at the beginning, the end, and on every line.

The aforementioned objects and advantages may be gained by employing the method and apparatus herein described. The underlying assumption in the application of this invention is that by increasing the labeling of objects within a secure environment the opportunities for control of sensitive objects will be increased.

The invention has an input side and an output side and can be configured on any signal lines that are in use in ADP today. Simply stated the device detects new line or carriage controls codes within data and inserts labels relative to the codes after these codes into the data stream. The device can also monitor data streams for the presence of labels and open the signal line carrying the data.

Label Insertion

The labels are intended to represent security identifiers. The method intends that at least every line of data is labeled. When installed to monitor the data output of a piece of equipment, the device can detect the code following a newline code as a label indicating security for the data. If the code is improper for the circuit being guarded, the device can open the output line and set up alarm conditions.

The other basic capability is that the device can open the line and send its own data to the output device while the incoming data is halted. This allows the device to 'write over' certain fields that have labels prefixing them.

The labels need not be inserted directly after the new line characters or carriage control characters, but some specific location that is related to these characters will also allow for occasions when a policy is implemented that all data shall be labeled. With this policy in effect the device can detect and guard for absence of a label, and if none is found coincident to the new line code, the alarm condition may be entered.

The preferred application of the invention consists of embedding labels within records or documents relative to the position of new line characters within character data, the labels representing the level of protection assigned to the data. This labeling technique assures that the data is labeled at least once per line within the body of the data.

For use on a communications systems receive line, this device may inject into the data stream a protection label following the newline characters as they occur in the data. Once the data has entered the general processing environment, software that is trusted can revise the security codes or labels appropriately upon reviewing key information within the data. Only a trusted process may modify the labels.

Documents produced on a local host computer by typing, or other means, may be passed through a scanning process and labeled before storing with a simple command and protection identifier, e.g., 'PROTECT<DOCUMENT NAME>LEVEL 2' executed by the document owner. Within a word processing software environment, the typist may elect to provide protection for a field within a document by inserting a control sequence at the beginning of a field; enter the data, and then enter a terminating control sequence at the end of the data, that will turn the protection off. By vastly increasing the labels within the data on a computing system there is a much more controllable information security environment.

The proceeding and following descriptions of the device do not include reference to connectors since many connectors can be applied depending on the equipment in use. Also, the power supply for the circuits in the device are not included. The device can be equipped with a small receptacle for a plug in wire that delivers the required DC voltage from a small power supply that plugs into a 115v AC outlet.

This powering technique is used on mary of today's ADP devices.

Label Detection

Also enhancing the ADP security features of a system is a device that will operate in conjunction with the labeling process. This device may be connected to the ports of computing equipment and provide a capability to monitor the data output from the equipment. The device can recognize the protection codes or labels within the data relative to the security label insertion codes as the data passes through, and may provide control capability to stop the flow of data by opening the transmission path, or it may let the data pass if the labels and objects meet the access requirements in effect. This device can also recognize the start of a protected field and change the data within the field to spaces, nulls or some other characters, and release the data following the field eliminating the information that was in the protected field. A protected field is a portion of a larger body of data that needs to be given protection other than the protection assigned to the larger body of data. For example, it may be desirable for a clerical person to have access to personnel records to get all employee addresses, or to complete some other task. But within a personnel record there may be some information that is not to be viewed by anyone not having an exact need to know. This privacy data can be protected by the device being explained here. By placing a label in front of the protected field immediately followed by an indicator of the length of the field, the device can erase the field for the given length. When the protected field code is detected, the device may check to see if the current user is authorized to view it, and if not, erase the remainder of the field by replacing the data. Optionally, one protection introducer can start the protection by turning on replacement data when detected, and continue to replace the data until a protection termination code is detected.

The placement of the labels for protecting a document is shown in FIG. 1. A document may be provided with a protection code at its beginning 1, and end 3 and at least every line 2 within a document. The characters selected for use as protection codes may be escape sequences that are chosen to be non-printing for output to character devices in accordance with the terminals or peripheral equipment in use at a given site.

The selection of the specific codes to use as control codes may be determined by ADP managers and may be configured into the device logic or software. The codes may be changed but would normally be configured and left in place. New codes could be added if need should occur to add special new categories of protection. A large organization may select codes to be used throughout its offices and could electronically exchange data that contained the codes, and thus maintain the protection levels and control codes throughout the information life cycle of the data within the organization.

Data processing security at a record level is directed to entire documents or records. Security at the field level attempts to protect smaller elements of data within a given record or document.

Figure 2:
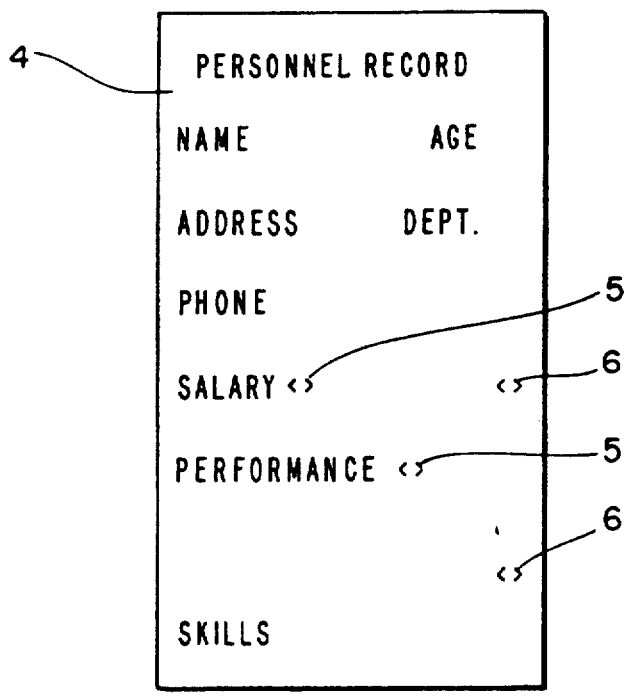
FIG. 2 shows a conceptual personnel record that contains data having security labels proceeding and following protected fields.

Shown in FIG. 2, is an ADP record 4 containing data that is available to clerical users; a personnel record. It may contain data in some of its fields that the data owners may wish to have protected from general clerical access. Medical information, credit history, performance appraisals and salary are some types of data that individuals may consider private. These types of data are often misused.

A control code, 5, shown placed at the beginning of a field of data, initiates protection and a second control, 6, ends the protection for that field. These protection codes are entered into the data to signal that the data between the codes is a protected field. When a user requests the data or an attempt is made to route the data to an output port the data will be detected by the device represented in FIG. 3. The device of FIG. 3 may be configured to detect the sensitive data prefix code and may act to protect it. This device may be attached at the output port of a general purpose data processor and is configured in a small package. It may be installed between ADP data output ports and the peripheral or terminal equipment in use. The connector of the cable that leads to the peripheral equipment is represented FIG. 3 as 115.

Figure 4:
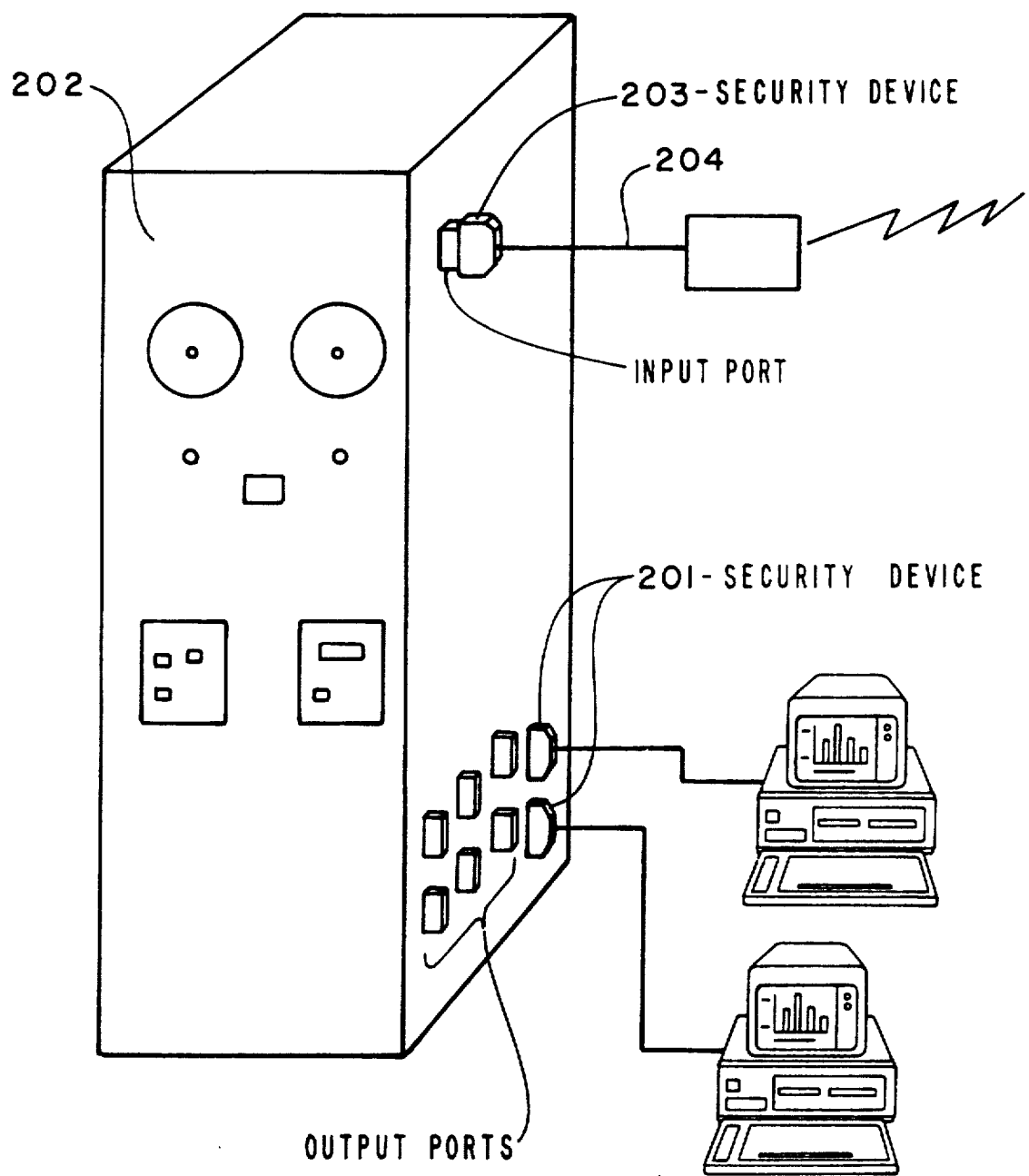
FIG. 4 shows the placement of the device in FIG. 3 on computer output ports to guard against data escaping inadvertently, and also shows the same device installed in the reverse direction to monitor incoming data and place labels in the data before it enters the computer.

Another view, illustrating the placements of the device, is presented in FIG. 4. Other placements are also possible. The general purpose processor, FIG. 202, is configured with the device 201 on two of the output ports. Another application and placement is shown in FIG. 4 where the device 203 is connected to an incoming port of the host computer. This application is implemented to insert security codes into the data stream of all data arriving via a telecommunications line 204. This implementation would have reversed connectors to accommodate the cabling but would still receive on its input side. In this 'label injection' application, labels are placed synchronous to newline or carriage control codes when they are detected in the input. These control codes appear routinely within text data to provide for the text to be started on a new line beneath the current line. Various new line codes are used in ADP. The device can be configured to recognize these variations. The labeling may be implemented to assure that data arriving at the input port cannot be viewed until it has been processed for release to authorized viewers. The device is shown processing data for both incoming and outgoing lines. In the case of processing the incoming data, the device is comparing the received characters to newline codes stored in memory means, and when the new line character is found, the micro-controller will insert a label after it in some relative position. To prevent the incoming data from overrunning the device, the speed between the device and the receiving computer is faster than the speed that the device is receiving from the telecommunications line. In this configuration the device does not close a direct path through it to its output side but opens the direct path and receives each character from the line and retransmits it to the general purpose processor input port. This mode of operation is somewhat different than the data protection mode.

Figure 5:
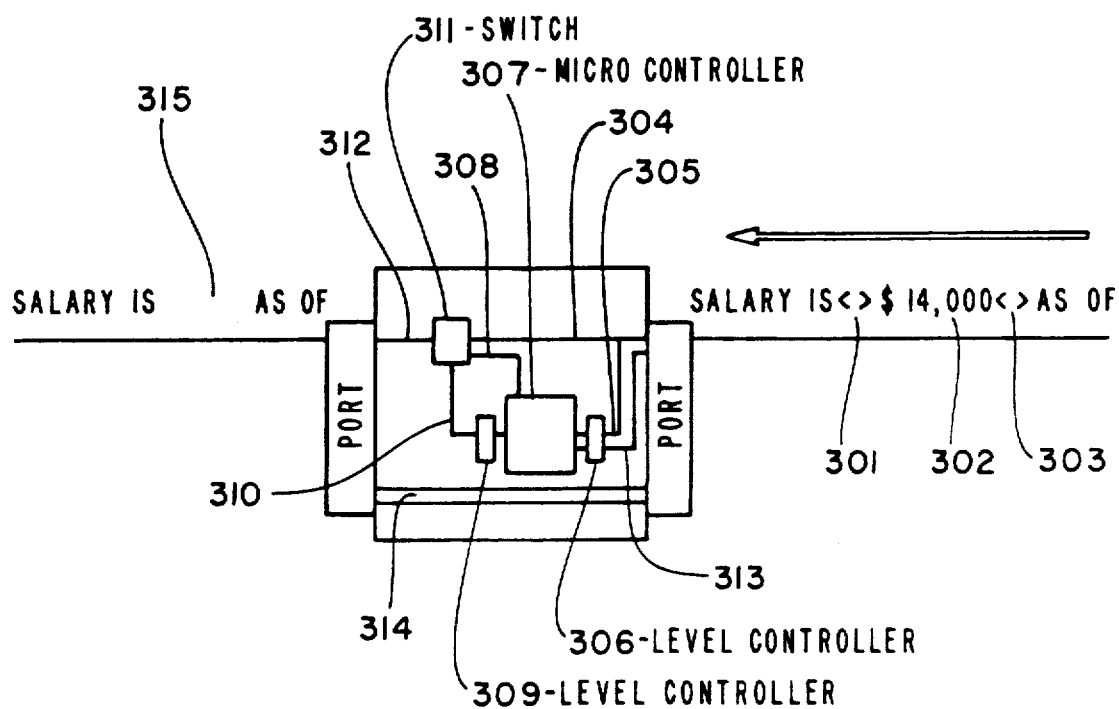
FIG. 5 shows the device trapping a labeled field and replacing the data within the field with spaces.

The diagram in FIG. 5 can be used to explain the use of the device as it operates to protect a field of data within another body of data. Lines 314 directly connect the ports of the device of the present invention. The device is configured to detect characters or sequences of characters. The device incorporates a switch 311 that can enable received data to pass directly from device input to device output. The switch can be opened to stop the direct flow of data through the device. When the direct path, 'pass through', is disabled an internal micro-controller can direct data to the device output port. The device can therefore completely stop the flow of data through it, stop it and interject its own data to the output, or allow the data to pass.

The security device being described compares all of the data that passes through it to the control codes that have been put into use for providing data protection. The control codes are not specified, since they are variable, but are represented in the drawings by '<>', to indicate their location.

Represented in FIG. 5, the data 302, entering from the right of the drawing, contains a salary figure that is prefixed by a code, 301, that indicates a protected field. The flow is right to left to display the character flow in the correct order. A second security, label 303, suffixes the protected field to signal the end of protection.

Data passing into the device on line 304 is normally routed through the switch 311 and out of the device on line 312, a direct pass through circuit. The incoming data is also routed via line 305 to the level converter 306. The level converter transforms the interface signal levels to levels appropriate to the micro controller. When the micro controller, 307, receives data from the incoming line, it will detect the protection code 301 and compare it to codes authorized to pass which are stored in memory. If the device was not initialized with a matching code, the micro controller will stop the flow of data at the switch 311 by operating the pass through circuit to an open condition. The micro controller control line 308 operates the switch 311. When the pass through circuit is opened the circuit from a transmit output line on the micro controller is closed. This enables the micro controller to pass data through level converter 309 and to the switch 311 on circuit 310. The switch has closed the connection between the controller transmit 310 and the output circuit 312. This closure enables the data from the controller to be sent to the destination device. Closing this path for a period of time equal to the character string transition time of the protected field enables the micro controller to enter into the data stream, in place of the field, spaces 315. The micro controller will continue to monitor the incoming data from the source, and upon detecting the suffix code 303, will close the direct pass through circuit and open its own transmit circuit thereby allowing normal operation to resume.

If a control code should occur in the data stream that is outside the range of permissions for the current computer session, i.e. is not permitted by security to pass at all, the device can open the electrical connection to the outgoing line and enter an alarm state. When the device has opened the pass through circuit a message may be sent to the computer operator via return path 313, to provide an alert condition. The operator may then clear the line after inspection, by sending a sequence of data to the device, that when compared by the micro controller will be recognized as an initialization sequence, and the device will act on the instructions following its initialization prefix.

The initialization of the device permission codes can be implemented in several ways. A method of coordinating the initialization with the software that controls the initial access to the machine could be easily implemented. At the session start up, while a user 'logs on' to a system, the appropriate device initialization sequence can be retrieved from the privileges list maintained on the host machine that stores the data protected by the device. The device can detect its own initialization sequence, and when it does so, it will open the pass through circuit to the user device until the initialization is complete to prevent the initialization code sequence from reaching the user device, and thereby keeping the initialization sequence private.

If coordinating the device initialization with the 'log on' was not feasible, users could send a message to the system operator, after they were connected, to request that their terminal be enabled for a secure session. The operator could then execute the appropriate command that would activate the proper authorization sequence to be sent to the device. Any attempt by a user to gain access to protected data before this was done would be detected at the device.

Several embodiments of the control device are possible and include various circuitry for implementing the detection. A simple version of the device may use a configuration of logic gates that are designed to detect a limited set of protection codes and open the line when found. Another embodiment uses an embedded micro controller that executes software instructions retrieved from its internal memory. The micro-controller is programmed to provide various levels of protection and can receive an initialization of the protection codes to be put in effect for a session at the session start up time. It is also possible to include most of the component parts of this invention in an Application Specific Integrated Circuit that will reduce the size and component count of this device further. Customizing an integrated circuit to a specialized application, such as this device, is a possibility but requires a large investment and market research.

Figure 3:
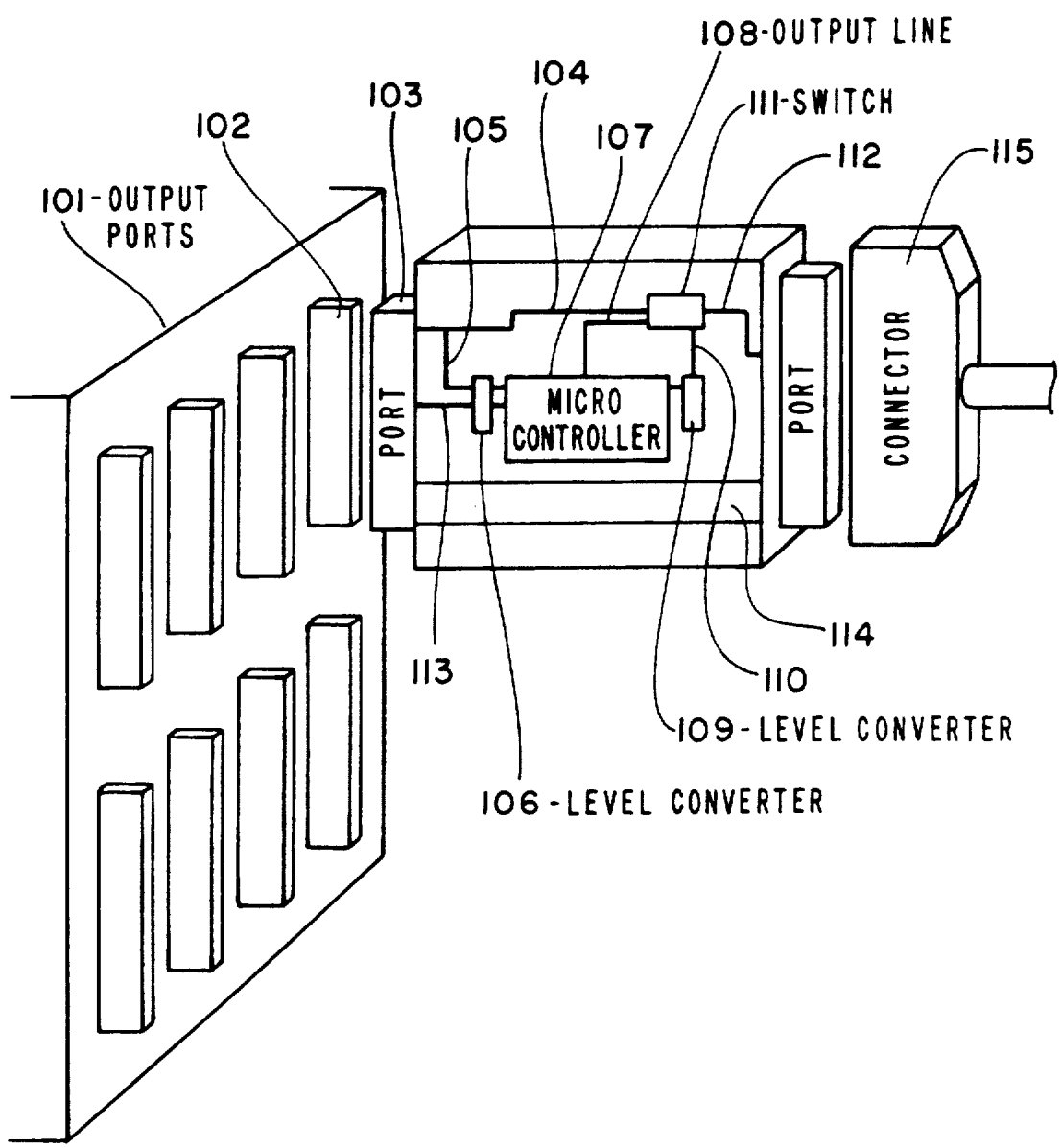
FIG. 3 shows a block diagram of an electronic device that can be attached to the input or output ports of a computer to insert labels when attached to the input or detect labels when attached to the output.

The drawing in FIG. 3 illustrates the output ports, 101, of a general purpose computer. As shown the security device herein explained is sufficiently small to fit via port 103 between the computer output port 102, and the connector on the cable that attaches the terminal equipment 115. Lines 114 directly connect the ports of the device of the present invention. One possible embodiment of the security device may include the device in the end of the cable connector. The micro controller, 107, provides the means of monitoring the data that enters the device. As the data enters into the device on line 104 it is also routed via line 105 to level converter 106, which may adapt the arriving signal to the appropriate signal levels whereby they may be passed into the micro controller 107 receive port. The software for the micro controller provides compare testing instructions to determine the presence or non-presence of labels and determines the action taken by the device upon label detection. The security labels are detected by first locating security label insertion codes within the stream of data by comparison of the data with at least one security label insertion code contained within memory. Then, the presence or absence of a security label relative to a security label insertion code is determined. The located security label is compared to at least one authorized security label stored in storage means. The stored authorized security label indicates required authorization to access the stream of data.

The micro controller output line 108 controls the switching means 111, which may be a silicon switch or a high speed relay device. Return transmission path 113 to the host computer carries data and messages when there is a need to send security alerts to the computer operator. The level converters 106 and 109 are used to convert the micro-controller outputs to the appropriate cable interface levels. Since the device can be installed on various interfaces, these converters may or may not be necessary, but various converters are readily available. Since many micro controller manufacturers now provide a wide range of communications interfaces internal to their controllers, the applications for this device are growing. High speed communications controllers are common products of the major semiconductor vendors.

When a computer system has these devices installed on all of the terminal ports, it can be easily seen how a single system command that broadcasts a control sequence to every port can cause all of the computer output ports to be disabled for output which may be desirable in the case where some security feature of the computer has determined that the machine is being browsed, pilfered or hacked. By including another set of contacts on the switch, and routing the peripherals inbound signal line through them, the broadcast command could completely disable all terminals on the system.

Another security feature of the device may be mentioned here. After normal output monitoring has begun a timer within the micro controller will be routinely reset as long as activity continues. If activity from the user device should stop for a predetermined period, the micro-controller, FIG. 107, may transmit a 'log off' command to the host on line 113 to terminate the session providing a disconnect of the device. This security activity is intended to disable unattended terminals, a known security problem. Several applications of the device may not use the signal returning to the host, as is the case where the device is put into place to monitor the computers output to a telecommunications line to assure that protected data is never sent out of the host machine over a telecommunications circuit unless it has been properly labeled. In such applications it is plausible that the security codes would be static within the software of the security device and not be initialized as in other applications. Audible alarms and push button resets can be implemented for manual intervention.

An alternative programming of the ADP security device can be referred to as receive and retransmit mode. This mode of operation would receive every character and retransmit them to the terminal device. The data would continue to be monitored for control codes, but after receiving the characters and testing them, the micro-controller would retransmit each character through level converter 109 via lines 110 and 112, to the output. The possible advantage of the receive and retransmit mode would be the elimination of the switching means 104, but this may not outweigh technical problems in problem isolation in the event that the terminal device was not working properly. The advantages of both implementations can be provided under software control. Software can be implemented that will leave the direct path closed, and after startup and correct operation is determined, switch to the receive and retransmit mode.

The inclusion of the switching means also provides a sought after capability in ADP security known as 'air gap' which means the electrical path has been truly broken and in fact has air between the opening. This is a required feature in some environments. The device represented in FIG. 3 may operate in the 'receive and retransmit' mode by modifying the software within the micro controller. The device is operating in this mode in the depiction of it in FIG. 4 where it is used to monitor the incoming flow of data, and inserts into the arriving data, a general protection code after any newline characters that it detects. This way all data arriving at the host computer will be marked and may be downgraded to appropriate protection levels by a more trusted process.

When the protection device is in operation and it detects a prefix indicating that the data that follows is a protected field within a larger body of data that the user is viewing, it may eliminate the field from the data stream. The prefix may as an example start with an ESC (escape character) followed by a protected field indicator and an indicator of the length of the field. This format may be used when allocating record structures for a database. A format that may be used from within a word processor may indicate the beginning of a protected field with a control sequence at the start of the data and another control sequence at the end of the protected field. Upon detecting this sequence, the device will open the direct path by controlling the switching means 111 and begin transmitting 'fill' characters to the user device to fill in the area where the protected field would have appeared at the user device, effectively erasing the protected data.

The device is capable of monitoring asynchronous data streams, as well as synchronous data streams, and can be programmed within the micro controlled to handle the various character coding schemes that are in use on various terminal and peripheral equipment. The embodiment of the device can be modified to accommodate various cable and connector types and remain equally effective.

Figure 6:
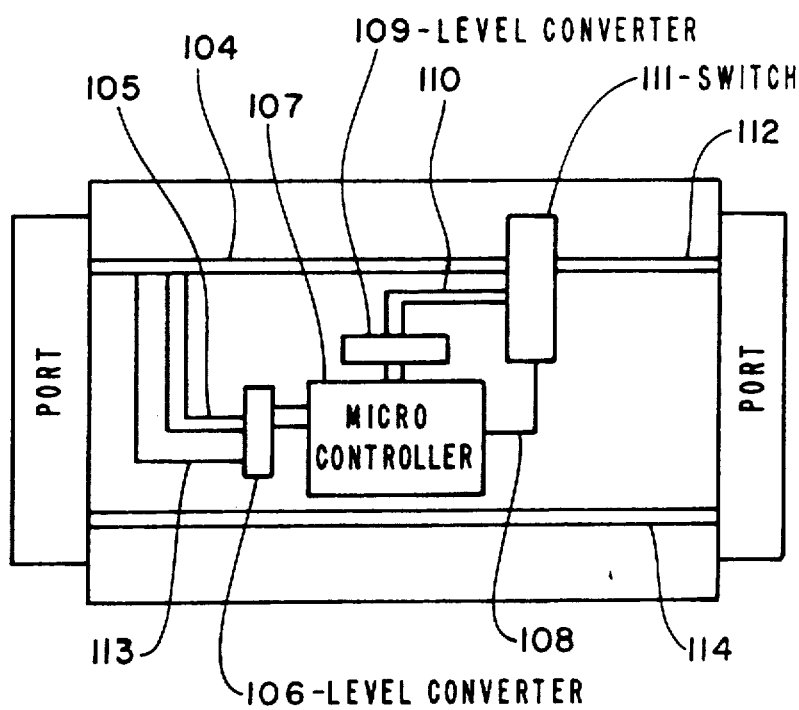
FIG. 6 shows the device of FIG. 3 configured to accept and process parallel data.

Another embodiment, shown in FIG. 6, of the device configures the components to provide the same functions as above, but is configured to process parallel data consisting of a plurality of incoming lines for the device and the utilization of multi-line switching means and the utilization of parallel ports on the micro-controller for input and output means. The reference numbers of FIG. 3 also apply to FIG. 6, with bus type representations.

The security device is monitoring the data stream for valid data passing to the user. If the data stream should become unreadable, the device software will begin a sequence of tests to determine if the transmission speed of the data has changed. By sequentially changing the speed settings and looking for valid data characters it will detect the new speed, and resume monitor activity. If no valid characters are found the device may detect that the data is binary (non character) data or that it is data that has been encoded and may allow or stop the transmission based on the initial permissions that were sent to it upon start-up. Binary data will not have the repetitions of the new line characters or control codes and can be halted if no permissions are present to allow the passing of unreadable data.

Summary Ramifications and Scope

Thus the reader will see that the security of data stored on a computer that utilizes this invention will be vastly enhanced and the ratio of the data to the number of security labels covering the data will be vastly improved.

The opportunities to implement new security features within a computing environment are improved by developing techniques based on the predictable occurrence of security labels relative to security label insertion codes. While the above description includes many specificities, these should not be construed as limitations on the scope of the invention. Many other variations are possible.

For example, a scheme may be used for labeling that synchronizes the label insertion in relation to common prefixes, suffixes, or even common word conjunctions that may be expected to occur within normal text.

Another example of the device's application may be on a local area network that a user wishes to configure in a way that one segment does not receive some categories of data. The device may be placed in line at the beginning of a segment in such a manner that all data passing to the segment would first pass through the device. When the device detects a label within the data protocol field that indicates its security level, it would have the option of allowing it to pass, inhibit the flow or send replacement data in its place. The replacement data would indicate to the protected segment that there was activity on the local area network, but the data would not be present in the transmission. This technique could be used in applications where the local area network is collision sensitive.

The use of labels within any of the communications protocols that use security fields would make the data suitable for receiving protection from the use of this device.

On multi-level security systems, data of a given classification is best stored in a segregated area from data of other classifications. In some instances a separate storage device may be assigned to a single category of data. The use of the above labeling technique would make it possible to occasionally scan the data in a designated area and verify that all of the data bears the same label. This scanning can be run as a background computing process that uses the computers unutilized time to verify the integrity of the various data bases in use.

The present invention may be used in the operation of a general purpose computer to compare data against a list of various new line control codes and insert or edit into said data in positional relationship with the new line control codes a single or multiple bit code or codes that may indicated: a) data security or data sensitivity control indicators, b) memory storage areas assigned to the data, c) disk space zone indicators or areas where said labeled data may be stored on disk, d) data that has been cleared for electrical communications transport, e) data that has been cleared for release to special groups, and f) data handling policies.

What is claimed is:

1. A data processing security device comprising:
   a) memory means for storing a plurality of authorized field protection introducer codes,
   b) means for evaluating a stream of data flowing from a source of character codes to identify field protection introducer codes within the stream of data, said means for evaluating being in communication with said memory means, said evaluating means comprising comparison means for comparing introducer codes within the stream of data to said authorized codes in said memory means, and
   c) means for replacing data after said field introducer codes within said stream of data with replacement characters if the field introducer codes within the stream of data do not match at least one of said authorized codes stored in said memory means, said means for replacing being in communication with said evaluating means.

2. A data processing security device as claimed in claim 1 wherein said means for replacing comprises switching means for outputting data after said field introducer codes within the stream of data when the field introducer codes match at least one authorized code stored in said memory means, and outputting said replacement characters when the field introducer codes do not match at least one authorized code stored in said memory means.

3. A data processing security device as claimed in claim 2 wherein said switching means comprises an air gap.

4. A method for controlling the flow of protected data through a computing environment comprising
   a) storing at least one authorized security label in storage means,
   b) storing at least one security label insertion code in memory means,
   c) receiving a stream of protected data flowing from a source of character codes and comparing the stream of protected data to said at least one stored security label insertion code,
   d) locating security labels within said stream of data based upon said comparison of paragraph (c),
   e) comparing the located security labels contained within said data stream to said stored at least one authorized security label,
   f) forwarding said labeled data stream to an input device when an authorized security label is located, and
   g) stopping the forwarding of said data stream based upon said comparison of paragraph (e) when an authorized security label is not located within said stream of data.

5. A method for controlling the flow of protected data through a computing environment as claimed in claim 4 wherein the step of stopping the forwarding of said data stream includes sending a message indicating a security alert to said source of character codes.

6. A method for controlling the flow of protected data through a computing environment as claimed in claim 4 further including the step of transmitting a session termination command to said source of character codes to stop the flow of said data stream if activity from said input device stops for a predetermined period of time.

7. A method for controlling the flow of protected data through a computing environment as claimed in claim 4 further including the step of replacing located security labels with other authorized labels.

8. A method for controlling the flow of protected data through a computing environment as claimed in claim 4 wherein said at least one authorized security label which is stored in paragraph (a) includes an escape sequence which is non-printing.

9. A method for controlling the flow of protected data through a computing environment as claimed in claim 4 wherein said at least one security label insertion code which is stored in paragraph (b) includes a new line or carriage control code.

10. A data processing security device comprising:
   a) receiving means for receiving a stream of data flowing from a source of character codes,
   b) memory means containing at least one security label insertion code, said memory means and said receiving means being in communication with a comparison means for evaluating whether the stream of data contains a security label insertion code contained within said memory means,
   c) security label storage means for storing at least one security label which indicates required authorization to access the stream of data,
   d) means for evaluating the stream of data to locate security labels within said stream of data relative to a security label insertion code within said stream of data, said evaluating means being in communication with said comparison means of paragraph (b) and with said security label storage means, said evaluating means including means for comparing the located security labels contained within said data stream to said at least one stored authorized security label, and
   e) means for forwarding said data stream from said evaluating means to an input device when an authorized security label is located and for stopping the forwarding of said data stream based upon said comparison by the evaluating means when an authorized security label is not located, said means for forwarding being in communication with said means for evaluating.

11. A data processing security device as claimed in claim 10 wherein said means for evaluating comprises a microcontroller.

12. A data processing security device as claimed in claim 10 wherein said means for stopping the forwarding of said stream of data is a switching means which comprises an air gap.

13. A data processing security device as claimed in claim 10 further comprising a port for electrical connection to a computer port through which said stream of data flows.

14. A data processing security device as claimed in claim 10 wherein said at least one security label insertion code contained within said memory means includes a new line or carriage control code.

15. A data processing security device as claimed in claim 10 wherein said means for evaluating further comprises means for verifying whether the stream of data contains valid character codes.

16. A data processing security device as claimed in claim 15 wherein said means for verifying includes means for changing the receiving speed of said stream of data and then reverifying whether the stream of data contains valid character codes.

17. A computer system comprising:
   a) a computer having an electrical port, and
   b) a security device electrically attached to said port, said security device comprising:
      1) receiving means for receiving a stream of data flowing from a source of character codes,
      2) memory means containing at least one security label insertion code, said memory means and said receiving means being in communication with a comparison means for evaluating whether the stream of data contains a security label insertion code contained within said memory means,
      3) security label storage means for storing at least one security label which indicates required authorization to access the stream of data,
      4) mans for evaluating the stream of data to locate security labels within said stream of data relative to a security label insertion code within said stream of data, said evaluating means being in communication with said comparison means for paragraph (2) and with said security label storage means, said evaluating means including means for comparing the located security labels contained within said data stream to said at least one stored authorized security label, and
      5) means for forwarding said data stream from said evaluating means to an input device when an authorized security label is located and for stopping the forwarding of said data stream based upon said comparison by the evaluating means when an authorized security label is not located, said means for forwarding being in communication with said means for evaluating.

18. A data processing security system comprising:
   a) a first data processing security device comprising
      1) first receiving means for receiving a stream of data flowing from a source of character codes,
      2) first memory means containing at least one security label insertion code, said first memory means and said first receiving means being in communication with a first comparison means for evaluating whether the stream of data contains a security label insertion code contained within said first memory means,
      3) first security label storage means for storing at least one security label which indicates required authorization to access the stream of data, and
      4) inserting means for receiving said stream of data, the inserting means being in communication with said first comparison means and said first security label storage means for inserting at least one security label stored in said first security label storage means into said data stream relative to the security label insertion codes within said data stream in response to said first comparison means, and
   b) a second data processing security device in communication with said first device, said second device comprising
      1) second receiving means for receiving the steam of data from said first device, 2) second memory means containing at least one security label insertion code, the second memory means and second receiving means being in communication with a second comparison means for evaluating whether the stream of data received from said first device contains a security label insertion code contained within the second memory means, 3) second security label storage means for storing at least one security label which indicates required authorization to access the stream of data, 4) means for evaluating the stream of data received from said first device to locate security labels within the stream of data relative to said security label insertion codes within said stream of data, the evaluating means being in communication with the second comparison means of paragraph (b)(2) and with the second security label storage means of paragraph (b)(2), said evaluating means including means for comparing the located security labels contained within the data stream received from said first device to said at least one stored authorized security label of paragraph (b)(3), and (5) means for forwarding said data stream from the evaluating means of paragraph (b)(4) to an input device when an authorized security label is located and for stopping the forwarding of said data stream based upon said comparison by the evaluating means of paragraph (b)(4) when an authorized security label is not located, said means for forwarding being in communication with said means for evaluating of paragraph (b)(4).

19. A data processing security system as claimed in claim 18 wherein said at least one security label insertion code contained within said first or second memory means includes a new line or carriage control code.

20. A data processing security system as claimed in claim 18 wherein said means for evaluating comprises a microcontroller.

21. A data processing security system as claimed in claim 18 wherein said means for inserting security labels is a microcontroller.

22. A data processing security system as claimed in claim 18 wherein said first device and second device each comprise a port for electrical connection to a computer port through which said stream of data flows.

23. A data processing security system as claimed in claim 18 wherein said means for evaluating further comprises means for verifying whether the stream of data contains valid character codes.

24. A data processing security system as claimed in claim 23 wherein said means for verifying includes means for changing the receiving speed of said stream of data and then reverifying whether the stream of data contains valid character codes.

* * * * *